United States Patent
Holz et al.

(10) Patent No.: US 9,929,817 B2
(45) Date of Patent: Mar. 27, 2018

(54) SYSTEM AND METHOD FOR 3D TRACKING FOR AD-HOC CROSS-DEVICE INTERACTION

(71) Applicant: YAHOO HOLDINGS, INC., Sunnyvale, CA (US)

(72) Inventors: Christian Holz, San Francisco, CA (US); Haojian Jin, Santa Clara, CA (US)

(73) Assignee: OATH INC., New York, NY (US)

( * ) Notice: Subject to any disclaimer, the term of this patent is extended or adjusted under 35 U.S.C. 154(b) by 656 days.

(21) Appl. No.: 14/547,553

(22) Filed: Nov. 19, 2014

(65) Prior Publication Data
US 2016/0139241 A1    May 19, 2016

(51) Int. Cl.
*H04B 17/318* (2015.01)
*H04B 17/27* (2015.01)

(52) U.S. Cl.
CPC ........... *H04B 17/318* (2015.01); *H04B 17/27* (2015.01)

(58) Field of Classification Search
CPC .............................. H04B 17/318; H04B 17/27
See application file for complete search history.

(56) References Cited

U.S. PATENT DOCUMENTS

| | | | | |
|---|---|---|---|---|
| 2002/0155845 A1* | 10/2002 | Martorana | ............. | G01S 1/022 455/456.1 |
| 2003/0142587 A1* | 7/2003 | Zeitzew | ............. | G01S 7/52004 367/127 |
| 2006/0276205 A1* | 12/2006 | Bengtsson | ............. | H04W 8/14 455/457 |
| 2007/0247368 A1* | 10/2007 | Wu | ............. | G01S 5/0221 342/465 |
| 2009/0233619 A1* | 9/2009 | Sirola | ............. | G01S 5/0294 455/456.1 |
| 2011/0270519 A1* | 11/2011 | Park | ............. | G01C 21/20 701/533 |
| 2012/0087212 A1* | 4/2012 | Vartanian | ............. | G01S 15/08 367/118 |

* cited by examiner

*Primary Examiner* — Hovhannes Baghdasaryan
(74) *Attorney, Agent, or Firm* — James J. DeCarlo; Greenberg Traurig, LLP

(57) ABSTRACT

Disclosed is a three-dimensional ad-hoc tracking system and method between two or more devices at a location. The disclosed systems and methods can be implemented on commodity mobile devices with no added components and require no cross-device calibration, in order to track surrounding devices. Such tracking can be achieved by fusing three types of signals: 1) the strength of Bluetooth low energy signals reveals the presence and rough distance between devices; 2) a series of inaudible acoustic signals and the difference in their arrival times produces a set of accurate distances between devices, from which 3D offsets between the devices can be derived; and 3) the integration of dead reckoning from the orientation and acceleration sensors of all devices at a location to refine the estimate and to support quick interactions between devices. The disclosed systems and methods can be implemented by cross-device applications on mobile devices.

19 Claims, 12 Drawing Sheets

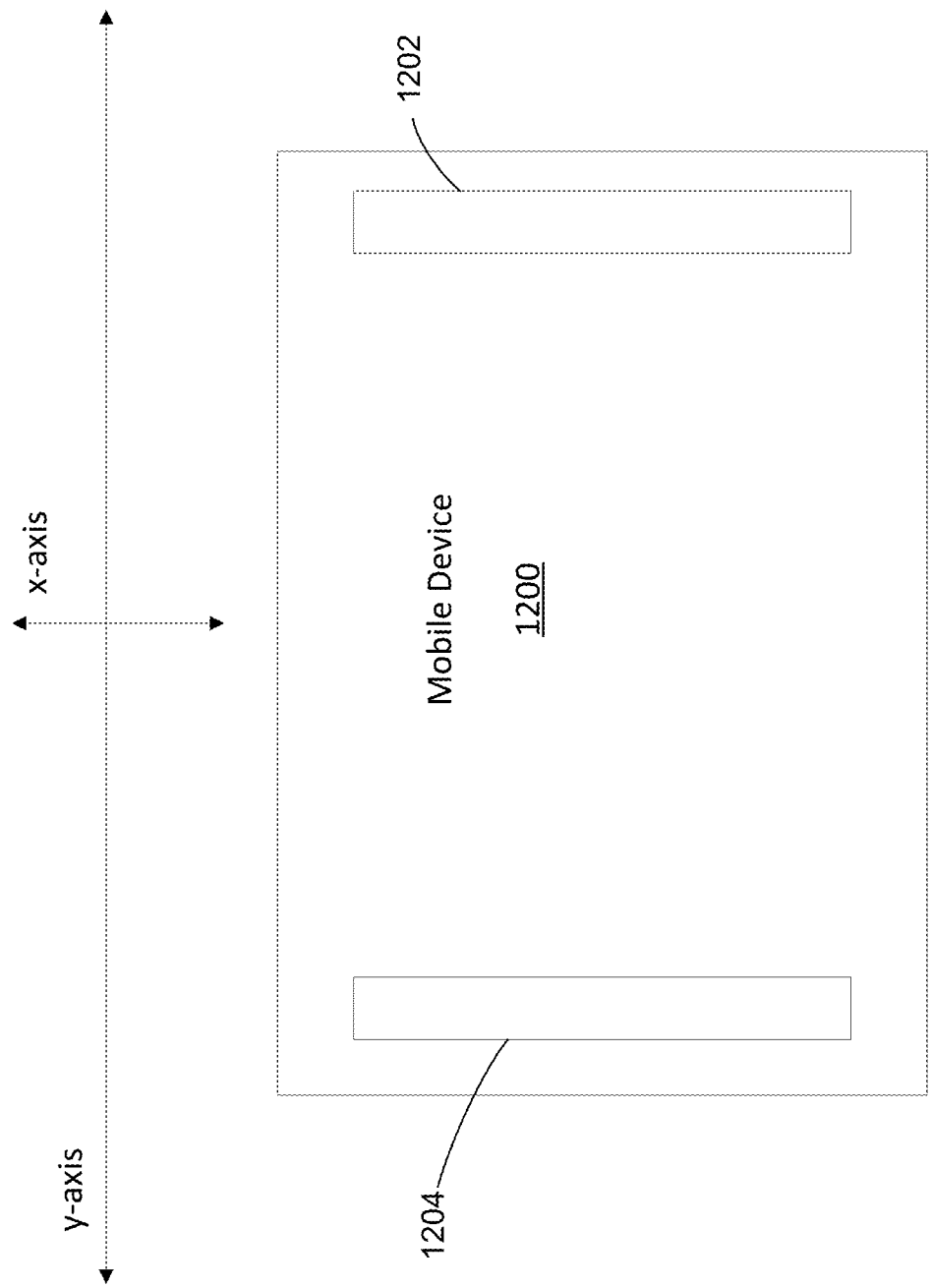

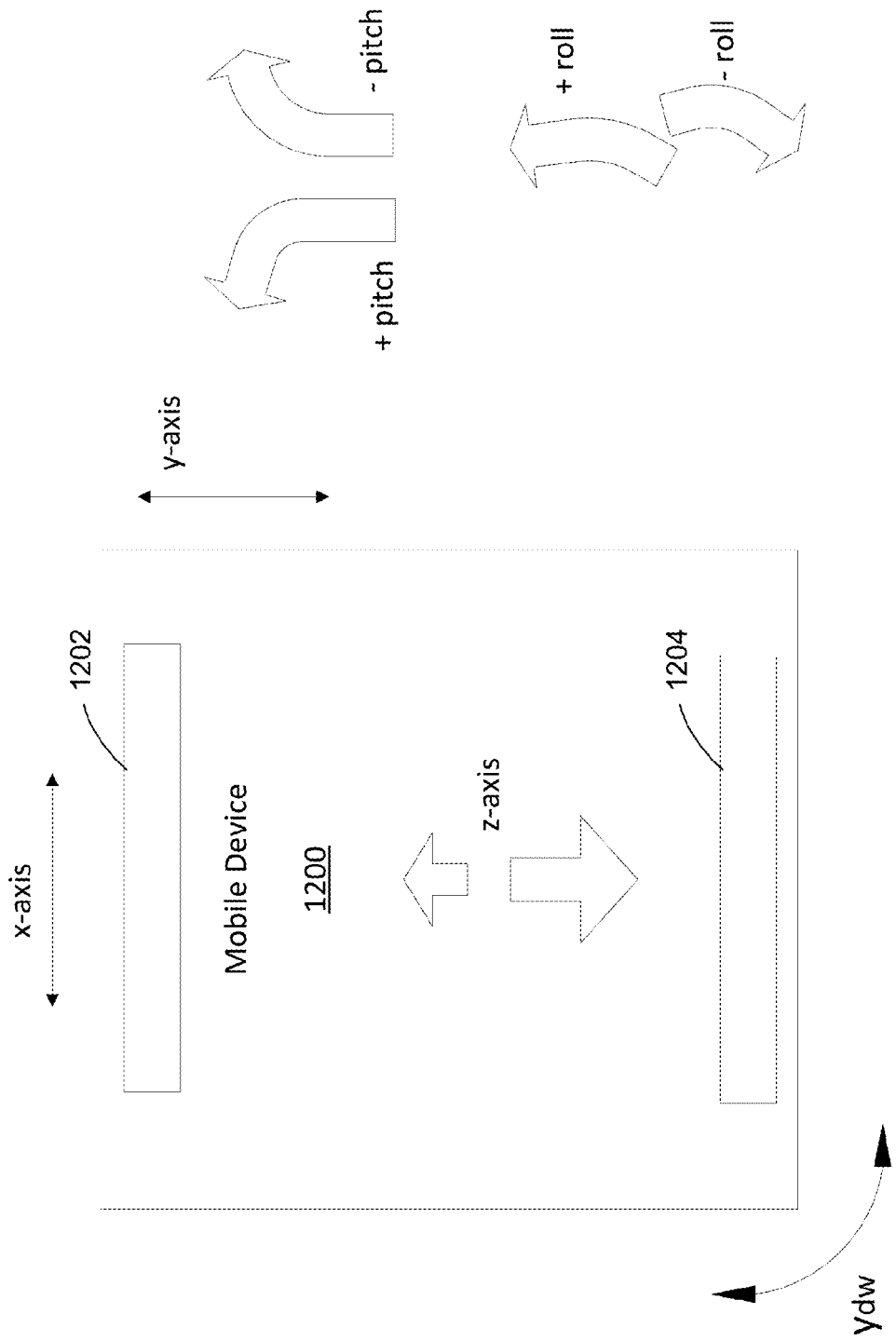

SYSTEM AND METHOD FOR 3D TRACKING FOR AD-HOC CROSS-DEVICE INTERACTION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to spatial awareness detection, and more particularly towards systems and methods for determining three-dimensional (3D) spatial presence of users at a location.

BACKGROUND

Bluetooth low energy (BLE) and radio technology can be used for robust location tracking. For example, such technology can be used in commercial situations to augment shopping trips in malls and airports by offering relevant suggestions or coupons, or to support experiences in stadiums during sports events. In order to track devices based on BLE or radio signals, conventional tracking systems interpolate the signal strengths observed for each device, essentially using signal strength as a distance cue.

SUMMARY

The present disclosure describes systems and methods for three-dimensional (3D) ad-hoc tracking between two or more devices at a location. According to some embodiments, the disclosed systems and methods can be implemented on any known or to be known commodity mobile device without the need for any additional components or cross-device application. Indeed, the disclosed systems and methods require no cross-device calibration. The present disclosure involves systems and methods for tracking surrounding devices at a location by fusing three types of signals in order to track the surrounding devices. Such tracking can be achieved by fusing three types of signals communicated to and from such devices at the location. According to some embodiments, the fused signals include: 1) the strength of BLE signals of each device; 2) inaudible acoustic signals of each device; and 3) dead reckoning of each device.

According to some embodiments, the BLE signals reveal the presence and distance between each device at the location. In some embodiments, the inaudible acoustic signals comprise a series of radio signals, whereby a difference between each signal's arrival time is utilized to produce a set of accurate distances between each device at the location. The set of distances can be used to derive 3D offsets of/between each device at the location. In some embodiments, the dead reckoning of each device involves integrating signals associated with orientation and acceleration sensors of each device at the location. The dead reckoning can be used to refine the 3D tracking and spatial information of the devices and location. The disclosed systems and methods involve each device at a location sharing the above mentioned signal information, which can be propagated throughout the set of participating devices at the location. The present disclosure enables the dissemination of the tracking information to peer devices beyond the reach of individual sets of devices.

In accordance with one or more embodiments, a method is disclosed which includes identifying, via a computing device, devices concurrently present at a location in a structure; determining, via the computing device, a Bluetooth Low Energy (BLE) signal strength associated with each identified device, the BLE signal strength determined from received BLE signals from each identified device; determining, via the computing device, an audio-distance measurement associated with each identified device, the audio-distance measurement based on acoustic signals and time stamps communicated to and from each identified device; receiving, at the computing device, an inertia measurement from each device; and determining, via the computing device, a three-dimensional (3D) spatial mapping of the location based on, for each identified device, the BLE signal strength, the audio-distance measurement and the inertia measurement, the 3D spatial mapping comprising identifiers and positional information of each identified device within the location.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for determining users' 3D spatial presence at a location.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 12 illustrates a block diagram of a coordinate system in accordance with some embodiments of the present disclosure; and FIG. 13 illustrates a block diagram of a coordinate system in accordance with some embodiments of the present disclosure.

DESCRIPTION OF EMBODIMENTS

Figure 1:
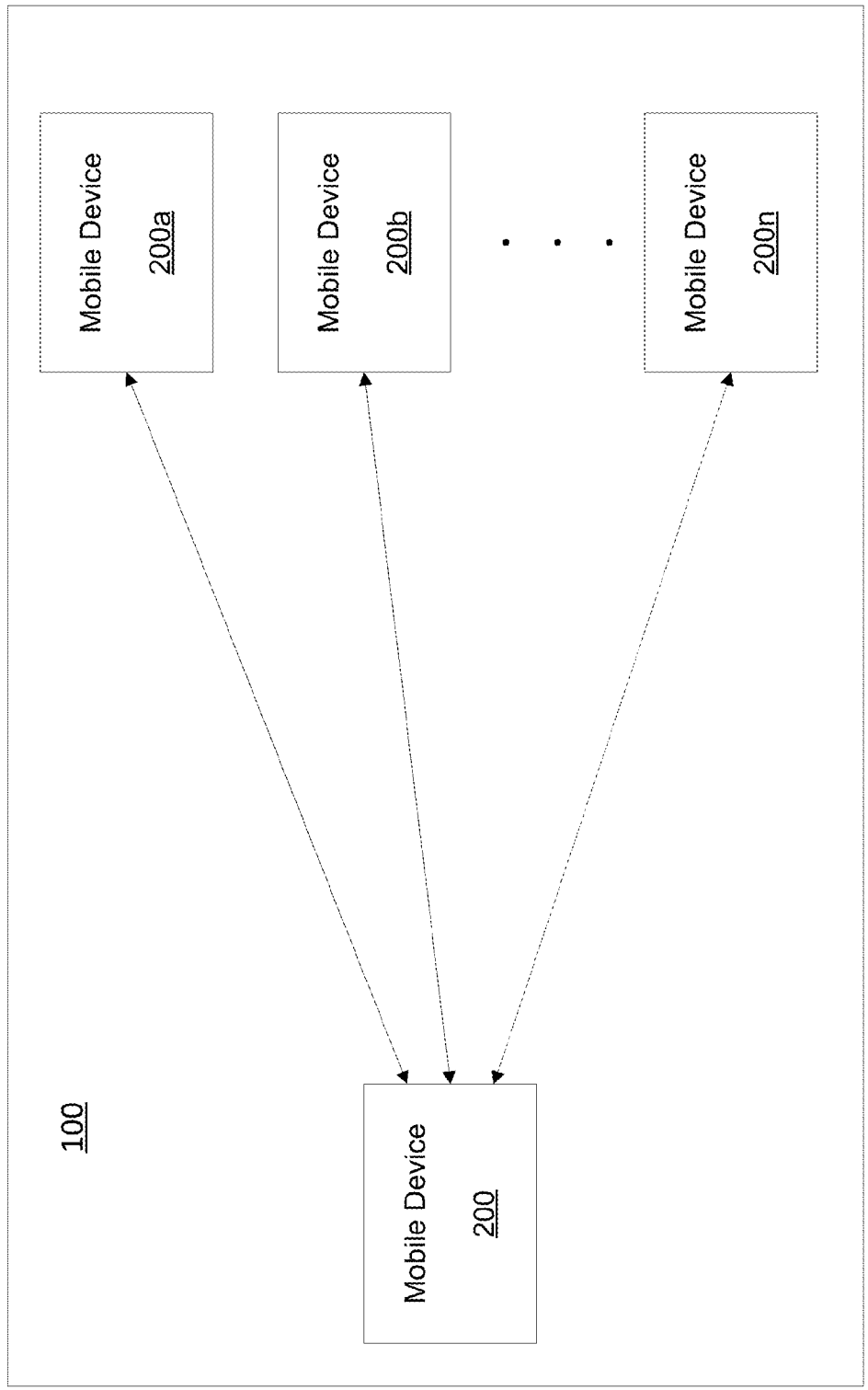
FIG. 1 is a schematic diagram illustrating an example of communication system according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, Bluetooth Low Energy Technology (BLE) as a function of the Bluetooth Core Specification Version 4.0 of Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, a compass, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, communication interactions with and between devices at a location typically involve devices establishing a notion of surrounding (or peer) devices' presence using Bluetooth® or WiFi® signals, which simply displays a list of detected surrounding devices (e.g., a list of available WiFi networks to connect to). Some conventional applications may use the strength of radio signals to estimate the distance to a surrounding device. However, the conventional systems and techniques are limited to one-dimensional spatial processing. That is, detection of spatial processing in such systems only produces a mere listing of detected devices. Such shortcomings fail to account for the fact that cross-device interactions, and a user's perception of such interactions, are spatial, in that they take place in a three-dimensional (3D) space.

The disclosed systems and methods remedy such shortcomings by determining a spatial awareness of surrounding devices in a 3D space, which includes the position of each device at a location, within a structure such as a building, shopping center, mall, stadium or other definable enclosed or open space, and can include a distance and direction of each device with reference to a specific device. That is, the disclosed systems and methods can sense users' presence and their position within a location (e.g., room, office, store) by determining the location of their mobile devices and laying out a 3D spatial mapping of the surrounding devices. The present disclosure enables ad-hoc cross-device mapping and interactions, and requires no external infrastructure as it is readily executed on any known or to be known commodity wireless device on which applications can run and that are equipped with communication functions outlined herein. For example, as discussed in more detail below, the disclosed systems and methods can enable file sharing between devices at a location simply by a user swiping items in the direction of a detected recipient.

As discussed in more detail below, the disclosed systems and methods can determine other devices' presence at a location from an aggregation of signal information. The signal information can be based on those device's BLE signals. The signal information can also be based on a determined distance and direction between devices from the difference in arrival times of multiple exchanged inaudible acoustic (or stereo) signals. Also, the signal information can be based on orientation and/or motion information detected using inertial sensors that each device is standardly equipped with or by detecting Doppler shift in detected signals. Thus, the disclosed systems and methods readily enable ad-hoc, spatial cross-device interaction between devices at a location without the need for calibration by solely using components found in current mobile devices.

The present disclosure will now be described more fully with reference to the accompanying drawings, in which various embodiments of the disclosure are shown. The disclosure may, however, be embodied in many different forms and should not be construed as being limited to the embodiments set forth herein.

FIG. 1 is a diagram illustrating a spatial mapping system according to some embodiments of the present disclosure. Not all the components may be required to practice the disclosure, and variations in the arrangement and type of the components may be made without departing from the spirit or scope of the disclosure. The spatial mapping system, according to some embodiments of the present disclosure, may include mobile devices 200, 200a, 200b, and . . . 200n located at and around a location 100 (where device 200n signifies that there can be any number of devices intermittently positioned or moving about the location).

According to some embodiments, as discussed below, the systems and methods discussed herein can be supported by microphone-only devices, such as, for example, smartwatches linked to a mobile device, where the two devices (watch and phone, or other combinations of wearable devices such as glasses or one or more items of intelligent clothing) form one logical unit. As discussed in more detail below, device 200 can have functionality related to BLE technology. The mobile device 200 may be a terminal for providing a user with a service via BLE communication with another mobile device 200a, 200b, and . . . 200n. For example, the mobile device 200 may register and manage information about the other devices, for example, Identification (ID) information, in a memory.

By way of background, Bluetooth™ technology enables short-range wireless communication, rather than having to use cables to connect devices to each other. That is, for example, when Bluetooth wireless technology is implemented in a cellular phone or a laptop computer, the cellular phone or the laptop computer may be connected to a wireless communication network without having to make a cable connection. All types of digital devices, including smartphones, tablets, phablets, printers, Personal Digital Assistants (PDAs), desktop computers, mobile devices and terminals, wearable devices or clothing, fax machines, keyboards, and joysticks and the like, can be a part of a Bluetooth system. Bluetooth wireless technology can also be used to form an interface between an existing data network and peripheral devices and form a special group between devices which are located far from a fixed network infrastructure. Bluetooth technology provides a robust wireless connection based on quick recognition and by using a frequency hopping method. A Bluetooth module avoids interference with other signals by hopping to a new frequency after the transmission or reception of a packet. Compared to other systems which operate within the same frequency range, the Bluetooth technology uses an especially short and fast packet exchange.

Bluetooth Low Energy (BLE) is a function of the Bluetooth Core Specification Version 4.0 of Bluetooth, which is a short-range wireless communication technology. BLE (also referred to as Bluetooth LE, and marketed as Bluetooth Smart), is a wireless personal area network technology aimed at novel applications in the healthcare, fitness, security, and home entertainment industries, in addition to smart home and proximity detection services. BLE provides considerably reduced power consumption and cost compared to classic Bluetooth, while maintaining a similar communication range. BLE is natively supported by mobile operating systems, including, for example, iOS®, Android®, Windows® Phone and BlackBerry®, as well as OS X, Linux®, and Windows 8®. BLE involves advantages including, but not limited to, low power requirements, operating for "months or years" on a button cell (i.e., a small single cell battery). As discussed herein, BLE has compatibility with a large installed base of mobile phones, tablets and computers.

Additionally, BLE supports "electronic leash" applications, which are well suited for long battery life, "always-on" devices. As understood by those of skill in the art, an electronic leash is the pairing ("leashing") of one or more wireless devices to a host device that allows the user to find misplaced or out-of-sight objects by activating the host device such that the "leashed" object identifies itself. Thus, BLE, via electronic leashing, can allow a single user-operated device to send communications to a large number of devices or objects.

Turning back to FIG. 1, mobile devices 200-200n, according to some embodiments, may be implemented in various forms. For example, mobile devices 200-200n may include virtually any portable computing device capable of connecting to another device and receiving information. Such devices include multi-touch and portable devices such as, but not limited to, cellular phones, smart phones, smart watches, display pagers, radio frequency (RF) devices, infrared (IR) devices, Personal Digital Assistants (PDAs), handheld computers, laptop computers, wearable computers, tablet computers, phablets, navigation devices, e-book terminals, integrated devices combining one or more of the preceding devices, and the like. Mobile devices 200-200n also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 100 may uniquely identify themselves through any of a variety of mechanisms, including a phone number, Mobile Identification Number (MIN), an electronic serial number (ESN), or other mobile device identifier.

In some embodiments, the mobile devices 200-200n may communicate identification information via a BLE communication network. As understood by those of skill in the art, such BLE communication can be coupled to, or implemented via a wireless network. A Wireless network may include any of a variety of wireless sub-networks that may further overlay stand-alone ad-hoc networks, and the like, to provide an infrastructure-oriented connection for mobile devices 200-200n. Such sub-networks may include mesh networks, Wireless LAN (WLAN) networks, cellular networks, and the like. Wireless network connectivity may further include an autonomous system of terminals, gateways, routers, and the like connected by wireless radio links, and the like. These connectors may be configured to move freely and randomly and organize themselves arbitrarily, such that the topology of the wireless network may change rapidly. BLE communication between devices 200-200n may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile device 200 with various degrees of mobility. For example, a wireless network BLE communication may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, such BLE communication may include virtually any wireless communication mechanism by which information may travel between mobile devices 200-200n.

Such BLE communication between mobile devices 200-200n at a location 100 can be enabled as a stand-alone network to employ any form of computer readable media for communicating information from one electronic device to another. For security of the information, such information may be secured by using a known or to be known negotiated encryption key or a pre-defined encryption key. Such encryption may occur at the mobile devices 200-200n, or some combination thereof. Within the communications networks utilized or understood to be applicable to the present disclosure, such networks will employ various protocols that are used for communication over the network. Signal packets communicated via a network, such as a network of participating digital communication networks, may be compatible with or compliant with one or more protocols.

Signaling formats or protocols employed may include, for example, TCP/IP, UDP, DECnet, NetBEUI, IPX, APPLE-TALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, each mobile device 200-200n may communicate or broadcast information directly or indirectly to and from each other or among groups of devices. That is, as discussed in more detail below, mobile devices 200-200n may communicate information associated with identification information, signal-strength information and/or location information, in addition to orientation information associated with the device and a gesture performed via the device.

In accordance with embodiments of the present disclosure, such communication detection is a representation of an ad-hoc network. There is, however, no requirement for an exchange of information between mobile devices 200-200n. In accordance with embodiments of the present disclosure, mobile devices 200-200n simply detect communication signals (e.g., broadcast signals) transmitted from each device 200-200n. There is no requirement for the mobile devices 200-200n to authenticate, connect or exchange data with other devices. Devices 200-200n, through sensors in or on the device, only need to detect signals output from the other devices in order to spatially map location 100 by simultaneously deriving the direction and distance of the other devices based upon signal strength measurements as discussed further herein. According to some embodiments, detection of the signals communicated or broadcast from mobile devices 200-200n may be detected via BLE communication, as discussed above.

According to some embodiments, the mobile devices 200-200n may broadcast the identification information in a format of an advertising packet, as discussed in more detail below. Such communication, or broadcast, can be implemented via the devices 200-200n and/or location 100 being coupled with an ad server that comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online or wireless advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through or at a location(s), and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Figure 2:
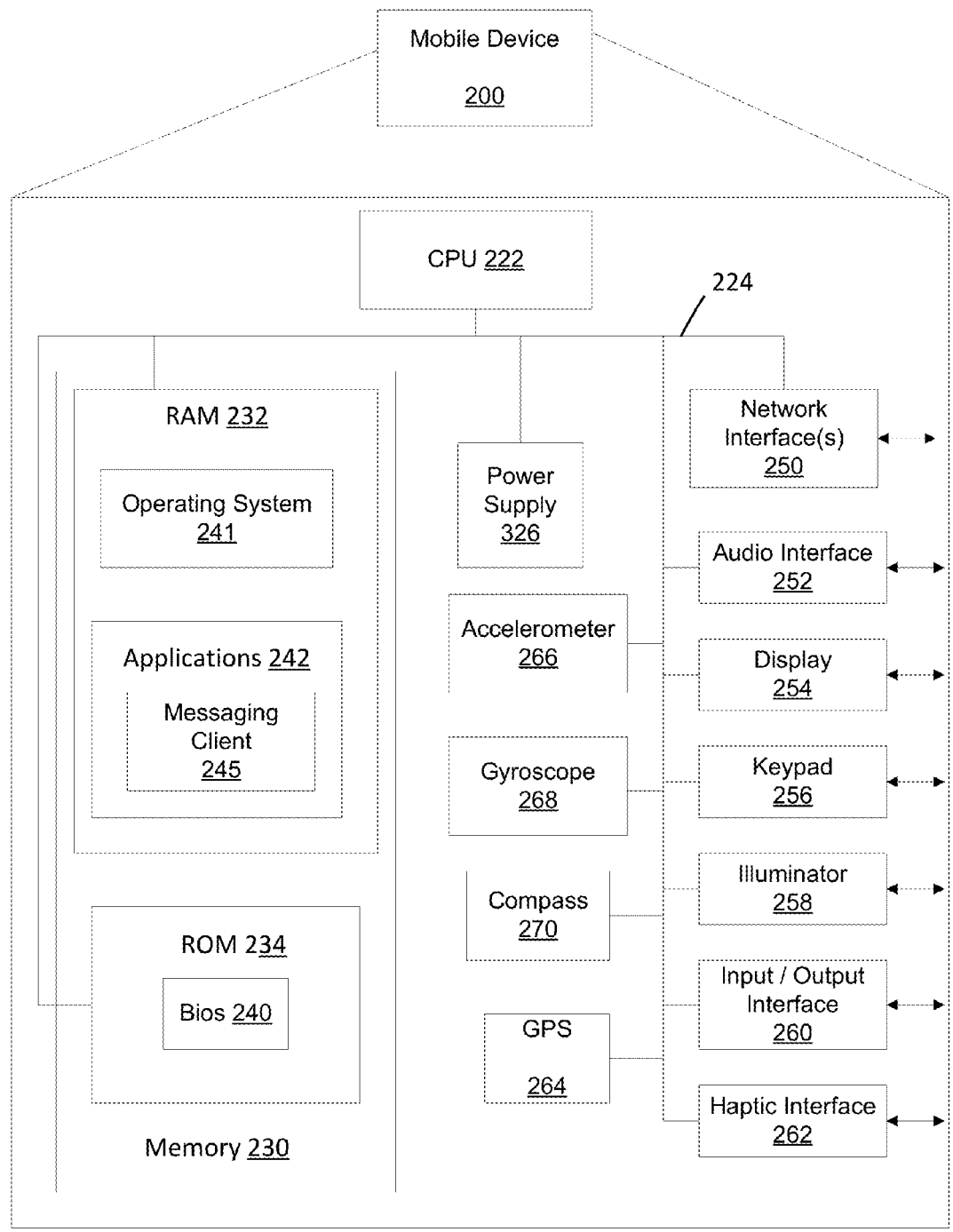
FIG. 2 depicts is a schematic diagram illustrating a client device in accordance with some embodiments of the present disclosure.

FIG. 2 is a schematic diagram illustrating an example embodiment of a client device that may be used within the present disclosure. As discussed above, a client device can be any type of mobile or portable device. For purposes of this disclosure, and for clarity of the following discussion, such devices will be referred to as "mobile devices". It should be understood that a mobile device refers to all types of portable devices that support BLE, as discussed above. Mobile device 200 may include many more or less components than those shown in FIG. 2. However, the components shown are sufficient to disclose an illustrative embodiment for implementing the present disclosure. Thus, mobile device 200 may represent, for example, mobile devices 200-200n discussed above in relation to FIG. 1.

As shown in FIG. 2, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling Mobile device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice or audio tones or signals. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the mobile device is powered. Also, illuminator 258 may backlight these buttons in various patterns when particular actions are performed, such as dialing another mobile device. Illuminator 258 may also cause light sources positioned within a transparent or translucent case of the mobile device to illuminate in response to actions.

Mobile device 200 also comprises input/output interface 260 for communicating with external devices, such as a BLE device/unit 100 (from FIG. 1) or a headset, or other input or output devices not shown in FIG. 2. Input/output interface 260 can utilize one or more communication technologies, such as USB, infrared, Bluetooth™, BLE, or the like. Interface 260 may include one or more units for communication between the mobile device 200 and the BLE device 100, or between the mobile device 200 and a server. For example, Interface 260 may include a BLE communication unit, a mobile communication unit, and a broadcasting receiving unit. The BLE communication unit supports a BLE communication function. The BLE communication unit may scan the BLE device 100 for a predetermined period of time or upon a request from a user. The BLE communication unit may involve a sensor hub. As understood by those of skill in the art, the sensor hub is a type of Micro Controller Unit (MCU) and may be connected to various types of sensors. The sensor hub, according to some embodiments can collect information about the external BLE device 100.

The communication unit of interface 260 may also support other short-range wireless communication functions, in addition to the BLE communication function. Short-range wireless technology may include, but is not limited to, a wireless Local Area Network (LAN) which could be a Wi-Fi, Bluetooth, WiFi direct (WFD), Near Field Communication (NFC), Ultra WideBand (UWB), or Infrared Data Association (IrDA) network, as discussed above with respect to BLE communication. The mobile communication unit of interface 260 transmits and receives a wireless signal to and from with at least one of a base station, an external terminal, and a server on a mobile communication network. The wireless signals may include, for example, a voice call signal, a video phone call signal or various forms of data used to transmit and receive text or multimedia messages. The broadcasting receiving unit of interface 260 receives broadcasting signals and/or broadcasting-related information from outside, via a broadcasting channel. The broadcasting channel may include, but is not limited to, a satellite channel and a terrestrial broadcast channel.

Haptic interface 262 is arranged to provide tactile feedback to a user of the mobile device. For example, the haptic interface may be employed to vibrate mobile device 200 in a particular way when the Mobile device 200 receives a communication from another user.

Optional GPS transceiver 264 can determine the physical coordinates of Mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Mobile device 200 on the surface of the Earth. It is understood that under different conditions, GPS transceiver 264 can determine a physical location within millimeters for Mobile device 200; and in other cases, the determined physical location may be less precise, such as within a meter or significantly greater distances. In one embodiment, however, Mobile device 200 may through other components, provide other information that may be employed to determine a physical location of the device, including for example, a MAC address, IP address, or the like. The device 200 can also determine the physical location, orientation, coordinates, directional movement or positioning, and the like via, for example, accelerometers 266, one or more gyroscopes 268, a compass 270, and the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Mobile device 200. The mass memory also stores an operating system 241 for controlling the operation of Mobile device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Mobile device 200 to store, among other things, applications 242 and/or other data. For example, data stores may be employed to store information that describes various capabilities of Mobile device 200. The information may then be provided to another device based on any of a variety of events, including being sent as part of a header during a communication, sent upon request, or the like. At least a portion of the capability information may also be stored on a disk drive or other storage medium (not shown) within Mobile device 300.

Applications 242 may include computer executable instructions which, when executed by Mobile device 200, transmit, receive, and/or otherwise process audio, video, images, and enable telecommunication with another user of another mobile device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described with respect to FIGS. 3-10.

Figure 3:
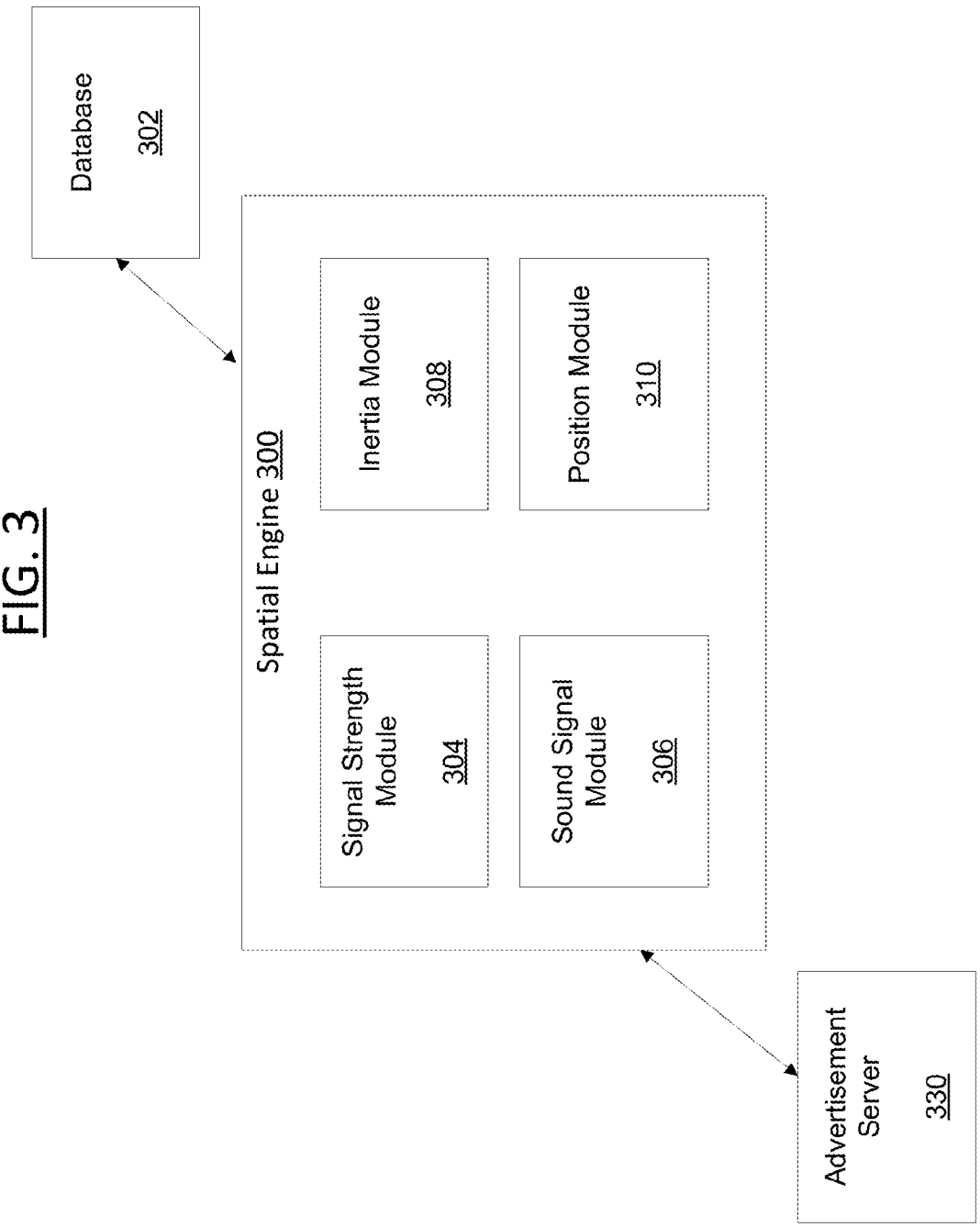
FIG. 3 is a schematic block diagram illustrating components of a system in accordance with embodiments of the present disclosure.

FIG. 3 is a block diagram illustrating the components for performing the systems and methods discussed herein. FIG. 3 includes a spatial engine 300, an associated database 302 for storing spatial tracking information and an advertisement ("ad") server 330. The spatial engine 300 could be hosted by a mobile device 200-200n, a separate BLE device(s) at location 100, a server, content provider, an ad server, and the like, or any combination thereof. According to embodiments of the present disclosure, the spatial engine 300 can be implemented via an installed or web-based application that executes on the mobile device 200.

As discussed in more detail below, spatial context information can be detected or provided to the spatial engine 300 or accessed by a computer program or device that can access the information. Such information, as discussed in more detail below, relates to determined distances associated between mobile devices at a location, distances between mobile devices and other BLE devices (or units) at a location, a mobile device's signal strength and the mobile device's identifier, orientation of the device, and the like. Indeed, the spatial information can include a type of mobile device, a user associated with the device, proximity data or location data associated with the mobile device, number of mobile devices within a proximity or associated with a location, among other types of information.

In some embodiments, the spatial information can be stored in a data structure in storage (e.g., a lookup table and/or other relational data format or structure) in database 302, which is associated with a location, coordinates, or, for example, a commercial entity. The database 302 can be any type of database or memory that can store the information mentioned above. The database 300 can be associated with a location, a device or a network. That is, for example, spatial information associated with a particular location, for example, a person's house, a mall or stadium, and can be stored in a database 300 that is dedicated to such location, as will be evident from the below discussion.

An ad server 330 comprises a server or ad platform that stores online advertisements for presentation to users. As discussed above, "ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Embodiments of implementations of the ad server 330 in connection with the spatial engine 300 will be discussed in more detail below.

The spatial engine 300 includes a signal strength module 304, sound signal module 306, inertia module 308 and a position module 310. It should be understood that the engine(s) and modules discussed herein are non-exhaustive, as additional or fewer engines and/or modules, or sub-engines or modules, may be applicable to the embodiments of the systems and methods discussed. The operations, configurations and functionalities of the engine and each module, and their role within embodiments of the present disclosure will be discussed in more detail below with reference to FIGS. 4-8 and their associated processes.

Figure 4:
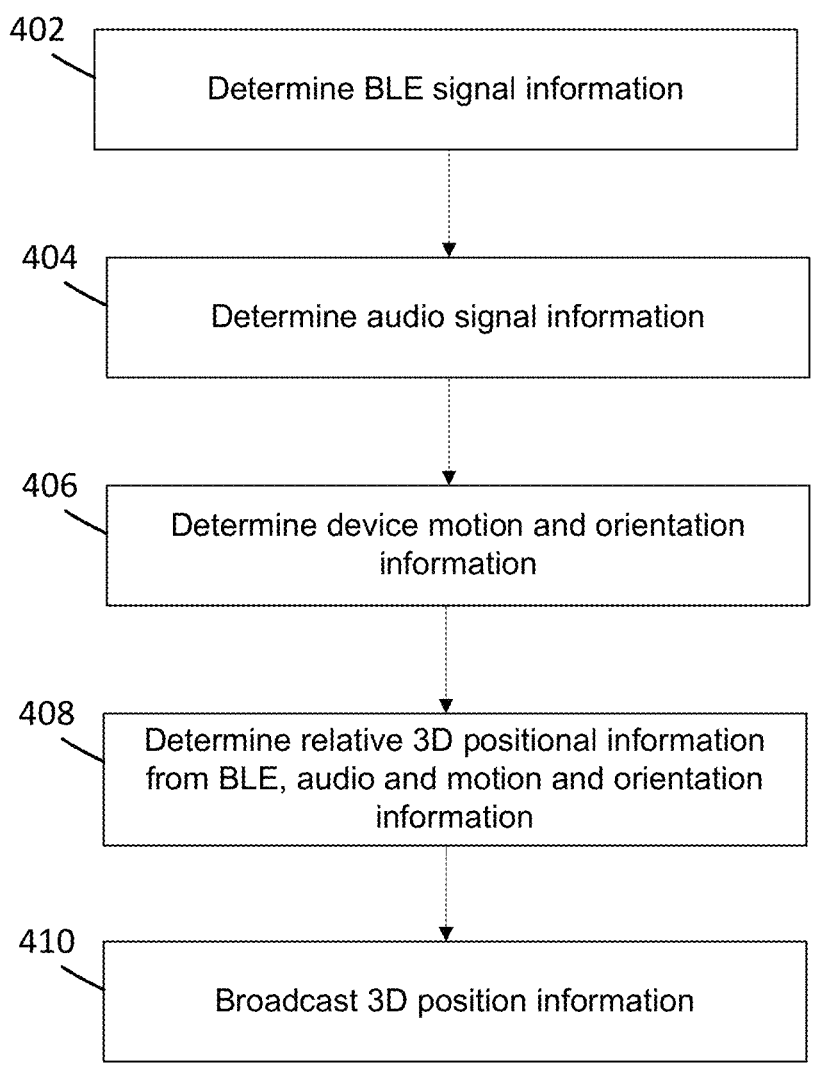
FIG. 4 is a flowchart illustrating steps performed in accordance with some embodiments of the present disclosure.

Turning now to FIG. 4, Process 400 discloses the determination of ad-hoc relative 3D positions of close-by-devices at a location. For purposes of this disclosure, "close-by-devices" refers to devices that are at a location and/or within a predefined distance to one-another. For example, 3 users may be at a mall, but only 2 of them are in the same store—therefore, only the 2 devices in the same store would be determined to be "close-by-devices." However, it should be noted that the inclusion or identification of devices as close-by-devices can vary depending on the location, number of devices within a predefined range, signal robustness, or activity/event occurring at the location, among other factors.

As discussed above, the disclosed systems and methods can determine relative 3D tracking of devices at a location without additional instrumentation than that typically equipped on standard commodity mobile devices, requires no stationary or preconfigured components in the infrastructure of such devices, and functions with resting as well as moving devices. In some embodiments, the devices implementing the disclosed systems and methods must have at least three audio components in any configuration and an orientation sensor(s). For example, two speakers and one microphone, or two microphones and one speaker. According to some embodiments, if at least two devices at a location satisfy audio component requirements, all subsequent devices at the location only require a single microphone or speaker. Thus, the disclosed systems and methods can be applied to on any known or to be known mobile device, as conventional devices feature the required minimum audio components.

According to some embodiments, as discussed above and in more detail below, the systems and methods discussed herein can be supported by microphone-only devices, such as, for example, smart-watches linked to a mobile device, where the two devices (watch and phone, or other combinations of wearable devices such as glasses or one or more items of intelligent clothing) form one logical unit. For example, once the phone's 3D position is determined, the related watch's location can be inferred despite instances of such devices having fewer audio units (e.g., typically, a smartwatch may only have a microphone, or only one microphone and one speaker). As such, treating these two devices as one connected logical unit (e.g., the smartphone and smartwatch as discussed above), the 3D positioning of not only each connected device can be determined, but also the 3D positioning of both devices as one logical unit can be determined.

Process 400 is performed by the spatial engine 300 running on a device to detect spatial information about other devices and a location. As discussed above, and in more detail below, implementation of the spatial engine 300 can establish spatial relationships between multiple mobile devices in order to effectuate ad-hoc file sharing between such devices. Instead of simply selecting a recipient from a list, as with conventional systems, a user is afforded the ability to communicate files to another user by simply swiping in the determined direction of another device.

The spatial engine 300 performs Process 400 which continuously updates the 3D understanding of surrounding devices of a location when one or more devices changes position. According to some embodiments, the disclosed systems and methods involve the spatial engine 300 executing at a variety of interactive rates on a mobile device to effectively capture the tracking information discussed herein. Such rates can vary based on user input, device manufacture design, application settings, network connectivity environment, and the like.

As discussed in more detail below, the spatial engine 300 achieves relative 3D tracking of devices at a location by fusing three types of signals computed by the signal strength module 304, sound signal module 306 and inertia module 308, respectively. A first signal is associated with signal strength of BLE signals emitted from each device at a location. This is processed by the signal strength module 304. A second signal is associated with exchanged audio signals between each device. This is processed by the sound signal module 306. The third signal is associated with the orientation and/or motion signals obtained from each device's sensors, which can be accumulated via dead reckoning. This is processed by the inertia module 308. The fusing of such signals is effectuated by the position module 310, and in some embodiments, the position module 310 processes the signals via any known or to be known estimation algorithm or filter, such as but not limited to, an Extended Kalman Filter (EKF) or other filter for reducing noise and outliers, as discussed in more detail below. Therefore, while the discussion below recites the use of an EKF, it should not be construed as limiting, as any known or to be known algorithm or filter can be used, as discussed above.

Each of the above signals (and signal information) contributes to the calculation of the spatial context information relative to 3D positions of each device at a location. Process 400 begins with Step 402 where the signal strength module 304 detects Bluetooth low energy (BLE) information from which information about the presence of surrounding devices and their identifiers can be determined. As discussed in more detail below in connection with FIG. 5, the signal strength module 304 can estimate the coarse distance to each peer device at a location from the strength of this signal. According to embodiments of the present disclosure, this information is continuously updated to reflect a compilation of present devices at a location and their coarse distances to each other, thereby establishing reliable spatial tracking.

According to some embodiments, when a predetermined threshold number of devices are present at a location, for example four devices, the signal strength module 304 can derive addition 3D location information by interpolating signal strengths between all present devices. According to some embodiments, the spatial engine 300 can leverage any known or to be known existing indoor tracking and/or navigation system (e.g., iBeacon®) based on such BLE information derived by the signal strength module 304 to further refine and stabilize calculated 3D positions.

In Step 404, the sound signal module 306 detects acoustic (or sound or audio) signals and their associated information are utilized to infer 3D positions, as discussed in more detail below in connection with FIG. 6. According to some embodiments, each device at a location repeatedly communicates (or plays) acoustic signals that provide each device's identifier. From this, the sound signal module 306 can also determine arrival timestamps of all signals, which can then be communicated or broadcasted to the other devices at the location. For example, devices can communicate audio signals via a speaker of the device and receive or record signals from other surrounding devices via a microphone on the device. From the differences in arrival timestamps on all participating devices at a location, the sound signal module 306 computes the distance between devices. According to some embodiments, the distance can be computed to the centimeter or another larger or smaller accuracy measurement, which may vary over time or iteration of timestamp broadcast as more data is collected and confidence in the data is increased.

Therefore, the spatial engine 300 can leverage the presence of devices to calculate relative 3D positions of devices from the set of distances between speaker-microphone combinations between devices. It should be noted that embodiments of the systems and methods discussed herein perform such calculations without synchronizing devices' audio clocks. Also, according to embodiments of the present disclosure, the exchanged sound (or acoustic) signals can be audible (chirps, bursts or fixed or multi-frequency tones, for example) or inaudible—for example, between 19-22 kHz, or some other fixed, variable or multi-frequency that can vary depending on factors present at the location or with the devices broadcasting such signals.

Additionally, BLE-based distance estimations from Step 402 can be calibrated continuously and in near-real time (i.e., on the fly) by using the distances that result from exchanged audio signals in Step 404, as discussed in more detail below. Since BLE signal strengths are fairly invariable for a given pair of devices, distance and environment, the signal strength module 304 can repeatedly update determined BLE signal strengths to accurate distances. This not only refines the accuracy of the distance cues between devices, but substantially improves the suitability of BLE signals for distance tracking in the case that audio signals become too unreliable.

In Step 406, the inertia module 308 detects information (or values) from device motion and orientation data produced from inertial sensors in each device. As discussed in more detail below in connection with FIG. 7, the inertia module 308 can implement, for example, any known or to be known dead reckoning filter or algorithm to compile the motion and orientation information/values and detect device motions and gestures with low latency. According to some embodiments, while the data from inertial sensors is naturally subject to drift, the inertia module 308 can use the BLE and/or acoustic signals to offset estimates from the inertia sensors, which provide much higher accuracy.

In Step 408, as discussed in more detail below in connection with FIG. 8, the position module 310 integrates the information determined by the signal strength module 306, sound signal module 308 and inertia module 310 by, by way of one non-limiting example, by fusing them through an EKF to determine relative 3D positions of each device at the location. The position module 310 can then broadcast the 3D positioning information to the other devices at the location. Step 410. Step 410 involves communicating or enabling access to a 3D spatial mapping of the location which identifies each device's position in a 3D space and an identifier of each device. According to some embodiments, a user can select another device and communicate information, such as content, media files and the like, to the selected device, where such communication can occur over a network associated with the location (as discussed above), or via a BLE packet (as discussed below).

Figure 5:
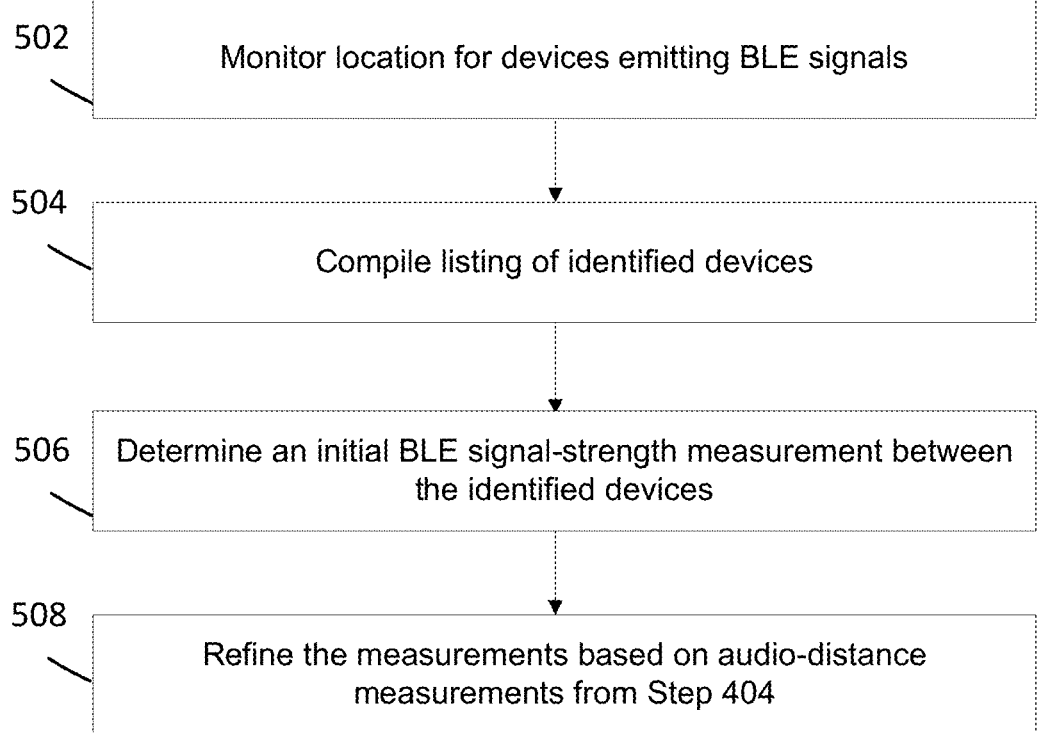
FIG. 5 is a flowchart illustrating steps performed in accordance with some embodiments of the present disclosure.
Figure 6:
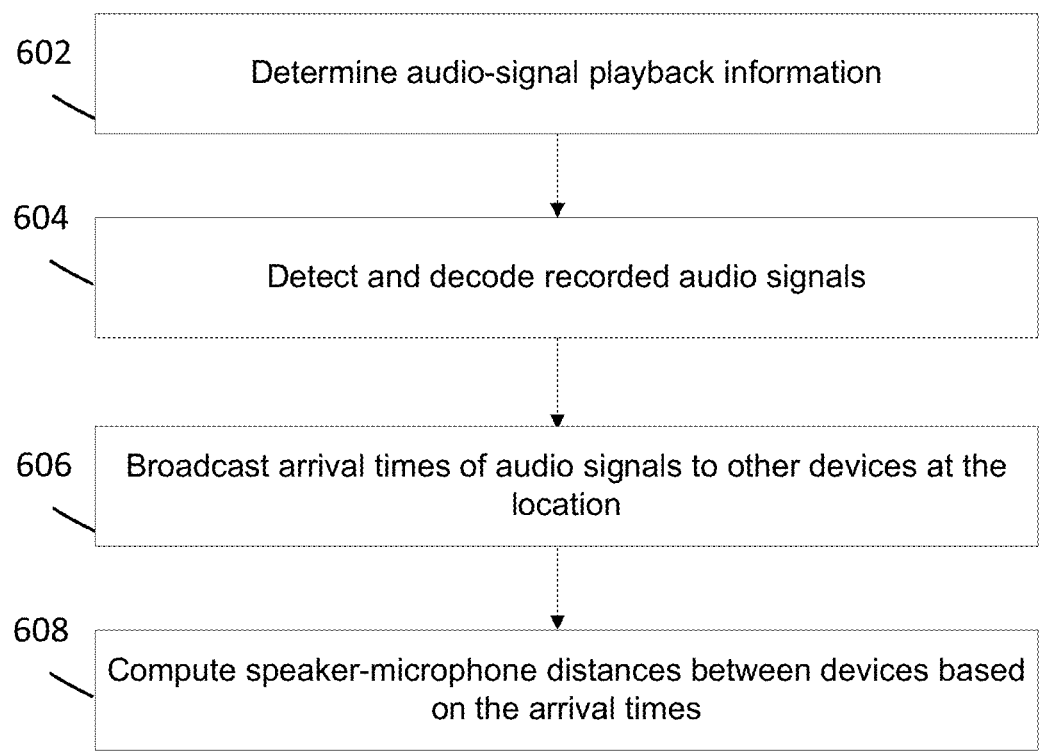
FIG. 6 is a flowchart illustrating steps performed in accordance with some embodiments of the present disclosure.
Figure 7:
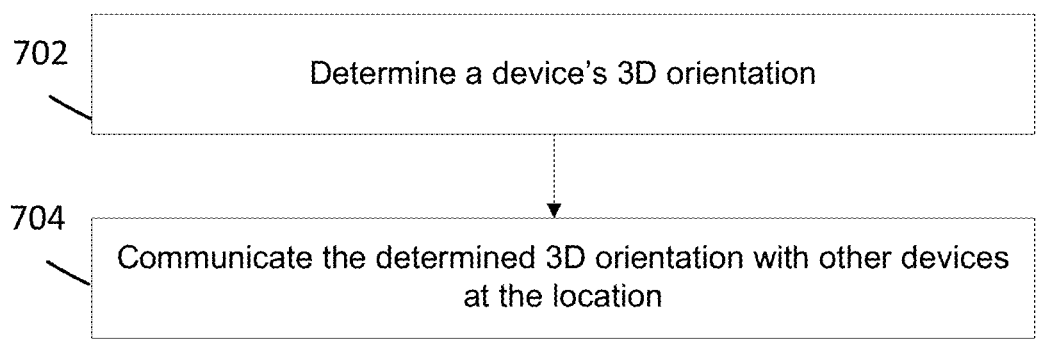
FIG. 7 is a flowchart illustrating steps performed in accordance with some embodiments of the present disclosure.
Figure 8:
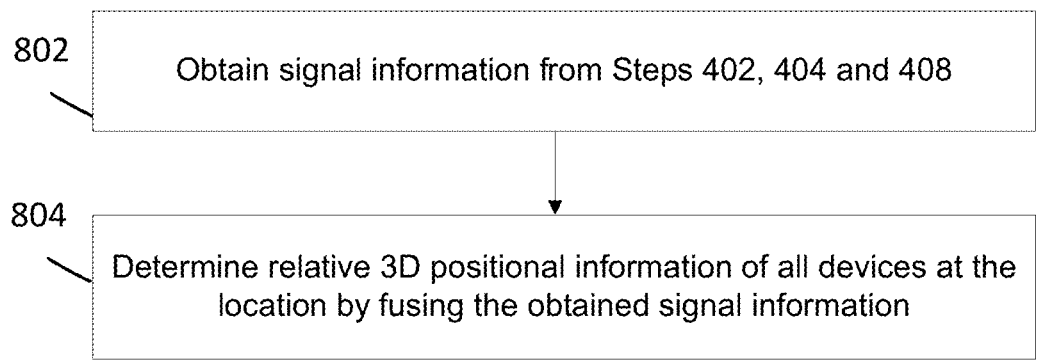
FIG. 8 is a flowchart illustrating steps performed in accordance with some embodiments of the present disclosure.

Turning now to FIGS. 5-8, each Figure will now be discussed in order to detail the steps being performed in Steps 402-408, respectively. That is, FIG. 5 discusses the details of Step 402 performed by the signal strength module 304. FIG. 6 discusses the details of Step 404 performed by the sound signal module 306. FIG. 7 discusses the details of Step 406 performed by the inertia module 308. FIG. 8 discusses the details of Step 408 performed by the position module 310.

FIG. 5 begins with Step 502 where the signal strength module 304 continuously scans a location for available devices with an active BLE signal. That is, a location is monitored to identify other devices at location within a threshold (or predefined) range that are emitting a BLE signal. In some embodiments, the strength of each BLE signals is also identified. In some embodiments, the monitoring or scanning occurs at a predetermined rate, for example, between 5 Hz and 10 Hz, or at fixed or variable time intervals such as every 500 ms or every two seconds; however, it should not be construed to limit the present disclosure to such range as the range can vary depending on signal strength, location environmental factors, user settings, device settings, application settings, and the like. As a result of the scanning, a list of detected devices is compiled and stored in a database (or lookup table), where the list identifies each device's identifier (ID). Step 504.

For each detected device, the signal strength module 304 determines an initial BLE signal-strength measurement between devices. Step 506. This step is based on a derived rough or estimated distance between devices at the location. Step 506. The estimated distance information can also be stored in the lookup table in association with the appropriate device's ID. In some embodiments, the rough distance is resultant a simple mapping from the signal strengths of the detected BLE signals. By way of a non-limiting example, the estimate can include a table mapping of signal strengths −45 to −80 dB in increments of 5 dB distances.

As an example for Steps 502-506, device 1 monitors a location and detects device 2 and device 3 emitting BLE signals. A listing is compiled and stored in a database which includes the device identifiers for devices 2 and 3. A rough or estimated distance is determined between device 1 to device 2, and device 1 to device 3 based on the detected BLE signals, which is also stored in the database.

In Step 508, the signal strength for each device is refined. As discussed in more detail below, the refinement of such mapping is based on a distance measurement resultant from the sound/audio information determination performed in Step 404 (and detailed below in FIG. 6). That is, Step 508 involves mapping the rough/estimated signal strengths (which are compiled and stored in Step 506) to the audio distances determined by the signal sound module 306 (which is discussed above in Step 404 and in more detail below in FIG. 6). The refined signal strength for each device is stored in the database (lookup table or relational database or other data structure), and according to some embodiments, the spatial engine 300 can interpolate all subsequent BLE based distance estimates determined by the signal strength module 304 using such table. This provides a real-time (or "on-the-fly") calibration increasing the accuracy of the spatial engine 300's signal-strength-to-distance mapping by leveraging the robustness of BLE signals.

FIG. 6 discloses the details of Step 404 performed by the sound signal module 306 for determining audio-distance measurements between the devices at the location. FIG. 6 begins with Step 602 which includes determining audio signal playback information. Step 602 involves sonifying a sender ID and speaker ID based on a determined distance between devices from a time-of-flight analysis of exchanged sound signals. This involves determining a precise moment (within design parameters and device capabilities, which, it is expected, will improve over time) or time interval at (or over) which sound signals reach (or are received at) each device.

By way of background, audio signals typically comprise two parts: an initial chirp or short burst to announce the signal and an ensuing payload. Audio signals can be broken down into a number of frames per second (or millisecond, for example) for communication of the signal to be received as a continuous stream of information, as opposed to receiving the signal as a singular packet. According to embodiments of the present disclosure, the audio signals discussed herein further include a sender ID, speaker ID and a counter encoded in the payload.

The purpose of the initial chirp in each audio signal is for the receiver to determine the precise frame at which the signal has been received. For this reason, the sound signal module 306 can use a linear up/down chirp (i.e., a sweep signal), which exhibits low cross-correlation and high auto-correlation, therefore facilitating precise detection. In addition, such chirps are robust to device motion, noise, and ambient sounds. The up chirp utilized in the example herein spans the entire frequency range available to spatial engine 300 (for example, 19-22 kHz—the inaudible range). The duration of frames in the audio signal is long enough for a sufficiently loud or robust sound to form, yet short enough to avoid influence from sounds from other sources such as ambient noise or voices.

As discussed above, sound signal module 306 encodes the sender's ID (e.g., device ID of the device emitting the acoustic signal), the speaker ID of the device and a counter into the payload of a signal. This enables receivers of the signal to determine the origin of each signal. According to some embodiments, predetermined portions (or bits) of the payload can be allocated for each of the encoded information. For example, 5 bits for encoding the sender ID can be allocated in the payload. In some embodiments, the sender ID can result from a hash of the device's BLE identifier. In another example, a 3-bit counter can be encoded into the payload of each message, which ensures that the arrival time of the signal may be compared across devices.

According to some embodiments, a key portion of the payload is the encoding using Hamming codes. This involves encoding concatenated bits into single bit units using two Hamming codes. For example, concatenating 5+3 bits into 8 bits, using two (4,7) Hamming codes. In some embodiments, Hamming codes improve the reliability of correct signal transmission as well as enabling the detection of overlapping signals, but other coding schemes now known or to be known can be utilized.

The sound signal module 306 can sonify (e.g., use of non-speech audio to convey information or perceptualize data) using biorthogonal chirps (also referred to as "candidate" signals). Such chirps can represent a predetermined number of bits (e.g., 2 bits) as a series of up or down chirps (e.g., 4 up/down chirps), whereby each chirp is orthogonal to the other chirp(s). This enables the recognition of each chirp series to be robust in light of other superimposed chirps. According to some embodiments, in order to avoid clicking or cracking of speakers when playing biorthogonal chirps in the inaudible spectrum, the signal sound module 306 can implement a fade-in and fade-out area of a predetermined number of frames at the beginning and/or end of a chirp. As such, for example, the fade-out frames of a prior chirp can be superimposed on the fade-in frames of the following chirp. It should be understood that while the discussion above involves biorthogonal chirps, it should not viewed as limiting, as the discussion above in connection with Step 602 can be effectuated with any other known or to be known types of sound encoding, including amplitude, frequency, chirp rate and code division multiple access (CDMA) encoding, and the like.

Step 604 involves detecting and decoding recorded audio signals. According to some embodiments, the disclosed systems and methods are based on the frame counter of the audio input stream, which encodes the timestamp running along a constant time rate. As discussed above, the spatial engine 300 does not require synchronization across input and output channels, as output from each device runs independently and may occur at arbitrary times. Note: the frame count will be referred to as the timestamp in the remainder.

According to some embodiments, in order to detect the initial chirp of an audio signal, the sound signal module 306 continuously analyzes the input stream from the microphone of another device at the location. A matched filter is run on the high-passed input signal in order to correlate the signal with the up chirp discussed above. Then, the sound signal module 306 searches the peak correlation value through a peak detection algorithm, and stores the frame count as a candidate signal. Such correlation results from the similarity with the up chirp and its amplitude in the recorded stream. Thus, Step 604 includes decoding all candidate signals. More specifically, the biorthogonal chirps that sonify the payload starting at the offset after each candidate frame are decoded.

Step 604 further includes decoding the biorthogonal chirps by correlating each part of the audio stream with each possible allocation(s) of a biorthogonal chirp. For each part of the chirp, a sample with the highest correlation value is selected. This process results in a predetermined number bits, which represents the Hamming code of the candidate signal. This coding is then decoded to obtain a number of bits, as well as an indicator that provides information indicating whether the Hamming code applied above is flawless (for example, an 8 bit decoded value can signify flawless audio information, where the number of bits can be a predetermined value, or depend upon the type or value of the candidate signals/chirp). If an error is detected, this candidate is discarded. Additionally, in some embodiments, the result of this detection Step 604 is discarded if the chirped sender ID is mismatched.

According to some embodiments, if the detection step 604 results in multiple flawless decoded candidate results, the sender ID and speaker ID of each decoded signal are compared and the earliest in time signal is selected; and in some embodiments, the later in time signal is discarded. Thus, Step 604 results in producing reliable decoding of superimposed sounds originating from different devices.

Step 606 includes broadcasting arrival timestamps to other devices at the location. More specifically, once a device has determined the precise frame at which a signal has been received, the sound signal module 306 transmits this timestamp to surrounding devices along with the receiver's device ID, device model, device orientation, and the decoded values as shown below in an example of a "receiver packet."

| receiver ID + model | receiver's timestamp | receiver's 3D orientation | decoded sender ID | decoded speaker | decoded counter |
|---|---|---|---|---|---|

Depicted above is an example of a receiver packet that can be radioed or otherwise transmitted and received over an ad-hoc wireless connection to surrounding devices upon detecting and decoding a received audio signal. According to some embodiments, instead of a receiver packet, a BLE packet or BLE advertising packet may be used or reused to communicate such information. As such, utilizing the BLE packet(s), the information could be broadcast without the ad-hoc network as it could be broadcast using BLE technology, as discussed above in connection with FIG. 1.

In addition to broadcasting the receiver packet after decoding a signal, the sound signal module 306 responds with a regular audio signal. This ensures that each participating device that has emitted an audio signal will hear back from surrounding devices. That is, every device will record a timestamp for an audio signal emitted by every device—including from itself. Step 606 results in stored timestamps from both, decoded audio signals as well as incoming receiver packets locally. According to some embodiments, the following distance calculations of Step 608 are invoked whenever new timestamps are broadcast (and received by a device), where the communication can occur through audio/radio or BLE communications.

Step 608 includes computing speaker-microphone distances from timestamps. That is, using an example of two devices: Device A and Device B for clarity, the distance between two devices is calculated based on the timestamps of two audio signals emitted by one of the two devices. This produces four timestamps overall: for example, Device A's signal as observed by itself ($t_0$) and by Device B ($t_1$), and Device B's signal by itself ($t_2$) and by Device A ($t_3$). According to embodiments of the present disclosure, these four timestamps produce the sum of the distances from the speaker on Device A to the microphone on Device B and from the speaker on Device B to the microphone on Device A. The sum of these distances can be obtained:

$$d_{sum}=c((t_3-t_0)-(t_2-t_1))+d_A+d_B, \quad (Eq.\ 1)$$

Here c denotes the speed of sound under the current conditions at the location and $d_A$ and $d_B$ denote the distances between the speaker and microphone on Device A and Device B, respectively. Eq. 1 evidences that there is no requirement for calibration of audio clocks between devices, for example: Device A and Device B. This computation is performed for each combination of speaker to microphone.

According to some embodiments, the sums of distances between all the devices at a location can be used two-fold. First, half of the average of all the distance sums can be fed back to update/refine the BLE signal strength-to-distance mapping, as discussed above in connection with Step 508. As discussed above, this improves the BLE signal information's static initialization mapping. Secondly, the distance sums between devices are utilized to map, compute and track the relative 3D positions of the devices at the location. That is, the position of Device A and the distance between Device A and B are known; thus, the 3D positioning of Device B to Device A can be determined, as discussed in more detail below.

FIG. 7 discloses further details of Step 406 performed by the inertia module 308 for determining the input from the inertial sensors of the devices at the location. FIG. 7 begins with Step 702 which includes the inertia module 308 continuously monitoring the location to identify and determine orientation information of a device based on the device's 3D orientation derived from the inertia sensors of the device. In Step 704, the device shares the orientation information with other devices upon receiving an audio signal as described above in Step 604. According to some embodiments, monitoring of the inertial sensors of a device by the inertia module 308 enables the detection and tracking of 3D device motions as well as gestures that are useful for interaction between devices, as discussed above.

According to some embodiments, to obtain stable device orientation, the device rotation can be anchored by a magnetometer, which can either be located at the location, or in some embodiments, on at least one device at the location. The magnetometer creates a rotation reference across all devices. In order to compensate for situations of inaccurate and/or slow magnetometer readings, yaw rotations from the gyroscope values can be determined, whose drift can be corrected using the accelerometer of the device when the device is not in motion. For example, location motions based on inertial sensors of a device can be detected based on determined patterns of left motions, right motions, up motions and/or down motions associated with the device. As a result, Step 406 results in the detection of reliable device rotation information and orientation information with low latency.

According to some embodiments, the inertia module 308 can additionally implement dead reckoning using inertial sensors of the device to provide responsive tracking. Specifically, the inertia module 308 can detect if a device is in motion or stationary using a mechanical filter and/or smoothing window, for example. That is, when set in motion, the inertia module 308 can detect the 3D direction through pattern matching and estimate the moved distance based on peak acceleration and time. According to some embodiments, the detection of speed and/or direction changes may only be used to fill in gaps between two subsequent audio signals, whereby such gap filling enables a more accurate 3D positions as described below.

FIG. 8 discloses further details of Step 408 performed by the position module 310 which fuses the signal information determined in Steps 402, 404 and 406, as discussed above in relation to FIGS. 4-7. The position filter 310 obtains (or receives) the determined signal information from the signal strength module 304, the sound signal module 306 and the inertia module 308, and executes an EKF algorithm on the signals associated with each device at a location. Step 802.

According to embodiments of the present disclosure, the modules of the spatial engine 300 execute at different rates on a device. By way of non-limiting example, the signal strength module 304 for determining BLE signal strength-to-distance information can execute at a frequency of 5 Hz; the sound signal module 306 for determining audio-based 3D positioning information can execute at 5 Hz; and the inertia module 308, which can represent an inertia measurement unit (IMU) for a device, can execute at 60 Hz.

Thus, in Step 804, the inertia module 310 can execute an EKF to fuse the signal information and smooth the measurements from the different modules. According to some embodiments, the EKF can execute recursively to compensate for minor or unintentional movements or rotations of a device detected by the inertia module 308 (from Step 406), and to compensate for noise, physical obstructions, ultra-sound interference, and the like (from Step 404). As discussed above in Step 410, after executing the EKF algorithm (via the EKF filter) on the aggregate signal information, the filtered information is then broadcast to the other devices at the location, where the broadcasted information comprises the relative 3D positioning of the devices at the location.

It should be understood that while the instant disclosure involves the application of an EKF, it is not so limiting, as any other known or to be known sensor (or signal), data and/or information fusion and integration algorithm or filter can also be utilized in a similar manner, as discussed herein, and not diverge from the scope of the present disclosure.

According to some embodiments, the EKF filter, while processing the aggregate signals of the spatial engine 300, can implement a state transition and control model, and an observation model to perform the 3D spatial measurements discussed herein. This ensures that the signal strength from the BLE measurements, distance determinations from the audio measurements and positioning determinations from the inertia measurements are accurate and up-to-date.

According to some embodiments, the position module 310 determines the local coordination system of the location. That is, since all surrounding device positions that are calculated are relative to the device making the calculations, a local coordination system is defined to ensure that the 3D positioning is consistent with the orientation and directional determinations of the calculating device. In other words, for each device that runs implements the spatial engine 300, the device defines itself as the center in the coordinate system; then, the relative coordinates of surrounding devices at the locations are defined as a state model by the EKF. As illustrated in FIGS. 12-13, the coordinates and orientation of a device 1200 can be determined. For example, as illustrated in FIG. 12, device 1200 comprises a microphone 1202 and speaker 1204. As discussed above, device 1200 can include a variety of microphones and speakers and the illustration of device 1200 only displaying one microphone 1202 and one speaker 1204 should not be construed as limiting as each component can indicate a plurality of such components. Device 1200 is shown with respect to an x-axis and y-axis. As illustrated in FIG. 12, the line connecting the microphone 1202 and speaker 1204 defines the y-axis, where the x-axis is orthogonal to the y-axis and the z-axis is the normalized axis to the x-y axes. Indeed, as illustrated in FIG. 13, device 1200's x-y-z axes are illustrated in accordance with the above discussion. FIG. 13 further illustrates a "+roll" and "−roll" which shows that device 1200 can change orientation and movement positions as detected by the gyroscope, compass or accelerometer(s) associated with device 1200, as discussed above and in more detail below. Device 1200's "$y_{dw}$" indicates a rotational value associated with device 1200's orientation and position, as determined by the gyroscope, compass or accelerometer(s) associated with device 1200, as discussed above and in more detail below.

FIG. 13 also shows that the microphone(s) 1202 and speaker(s) 1204 of device 1200 can detect audio signals in any direction, which can be referred to as "+pitch" and "−pitch" based on the directional axis the signal is communicated.

According to some embodiments, the x-axis and y-axis are defined according to the orientation of the device. In some embodiments, coordinates' axes can be defined according to the coordinates of the location, another device, and device 1200, or some combination thereof, as discussed herein.

For example, for a device having coordinates Px, Py, Pz (representing the x-, y-, z-axis coordinates at a location as determined in accordance with the above discussion in relation to FIGS. 12-13) at time T, the following formula is used to determine a positional transitional model (or coordination system):

$$S_k = [P_x, P_y, P_z]^T,$$ (Eq. 2)

According to some embodiments, a control model is determined. That is, from Step 406's dead reckoning estimations, the position module 310 can account for quick and/or minor device motions using the IMU (from the inertia module 308). These inferences are utilized as input to the above equation to produce a control model for the location:

$$u_k = [\Delta x, \Delta y, \Delta z]^T,$$ (Eq. 3)

Using the above state model from Eq. 2 and the control model from Eq. 3, an updated state model is formed. That is, for example, using two devices at a location: Device A and Device B, the state model can be formed as:

$$S_k = A \cdot S_{k-1} + B \cdot u_{k-1} + w_k,$$ (Eq. 4)

Where A signifies the signal information associated with Device A, and B signifies the signal information associated with Device B. $W_k$ signifies an offset associated with a device (such as from the dead reckoning), as discussed above, which accounts for discrepancies between the two devices' readings. Indeed, the offset accounting ensures that the raw data accumulated by the devices is analyzed to remove any unreliability from any unintentional movements of the device and/or noise detected with each signal.

According to some embodiments, the EKF filter can also establish an observation model that is specific to the location. As discussed above, by way of an example for explanation purposes using a location having two devices present, four distinct distances are determined between the devices based on the exchanged audio signals (Step 404) and another distance determination based on BLE signals (Step 402). An observation model can be established based on these determined distances. The four audio-based distances, referred to as ($d_{ll}$, $d_{lr}$, $d_{rl}$, $d_{rr}$) are processed to get an initial observation:

$$Z_k = [d, \cos \theta, \cos \varphi]^T,$$ (Eq. 5)

Where d represents each audio-based distance, and θ is the angle between a vector pointing to another device and reference device's y-axis. φ is a similar angle on the other device. For example, between two of the devices, Devices A and B among the four devices:

$$\cos \theta = \frac{A_r B_m - A_l B_m}{W},$$ (Eq. 6)

$$\cos \varphi = \frac{B_r A_m - B_l A_m}{W},$$

For the distance determined from BLE determinations, the d value is updated due to changes in: cos θ, cos φ, which are typically relatively small during the short distance movement. Thus, Device A and Device B's relative positions can be inferred in connection with each device's y-axis:

$$M_A(a_1, b_1, c_1) \quad S_{AL}(a_2, b_2, c_2) \quad S_{AR}(a_3, b_3, c_3),$$ (Eq. 7)

$$M_B(a_4, b_4, c_4) \quad S_{BL}(a_5, b_5, c_5) \quad S_{BR}(a_6, b_6, c_6),$$ (Eq. 8)

According to some embodiments, the EKF filter can also determine a rotation matrix R from the IMU measurements of the inertia module 308, which maps a device's coordinates to polar coordinates. Based on this, a device's relative coordinates can be translated to the reference device's local coordination system. For example, $M_B$, for Device B, has a relative coordination to Device A's coordination system, which results in:

$$M_R^T = R_A^{-1} R_B M_B, \quad \text{(Eq. 9)}.$$

Similarly, the EKF can denote $$M_2^T(a_4^T, b_4^T, c_4^T) \; S_{1L}^T(a_4^T, b_4^T, c_4^T) \; S_{1R}^T(a_6^T, b_6^T, c_6^T), \quad \text{(Eq. 10)}.$$

Therefore, given any positional state $[P_x, P_y, P_z]$ and two rotation matrixes, the distance between devices (e.g., from a microphone of Device A to a speaker of Device B) can be inferred as follows:

$$A_l B_m = \sqrt{\{(a_4^T + x - a_2)^2 + (b_4^T + y - b_2)^2 + (c_4^T + z - c_2)^2\}} \quad \text{(Eq. 11)}$$

$$Z_k = h(S_k) + H \cdot (S_k - S_k^-) + v_k,$$

where h can be inferred from Eq. 6, and H is a Jacobian matrix of h. Thus, as discussed above, EKF algorithm can be implemented to recursively execute so as to account for time and measurement updates for each device at a location.

According to some embodiments, the disclosed systems and methods can employ a residual model to calculate the 3D offset, as discussed above. In some embodiments, all determinable points in a location's space are searched in order to calculate a residual error of each point—each point having x, y and z coordinates within the location. In some embodiments, each determinable point may only involve points having a device's location associated therewith. In some embodiments, such searching and calculation can be performed by any known or to be known residual modelling technique and/or algorithm. The point identified as having the smallest error is identified, and based on this point, the residual calculation for the entire location can be determined. That is, from the initial observation discussed above, in reference to the four audio-based distances referred to as (dll, dlr, drl, drr), the residual error for any position (x, y, z) (e.g., any device's position in the location) can be calculated based on a simulation of another 4 audio-based distances based on orientation data of a device (orientation data discussed above), thereby resulting in the data set: (simu$_{dll}$, simu$_{dlr}$, simu$_{dlr}$, simu$_{drr}$). Therefore, the calculated residual error for a position (x, y, z) is determined as follows:

$$(x,y,z)=[(simu_{dll}-dll)^2+(simu_{dlr}-dlr)^2+(simu_{drl}-drl)^2+(simu_{drr}-drr)^2] \quad \text{(Eq. 12)}$$

In accordance with embodiments of the present disclosure, in connection with the above discussion related to FIGS. 3-8, below is a non-limiting example described to illustrate the spatial engine 300's extension to 3D spatial mapping and tracking for cross-device interactions.

For example, there are over 50 people present at a restaurant; however, only 3 people are seated together at a table, therefore these three people, and their associated mobile devices are determined to closely collocated. The three users have devices: Device A, Device B and Device C, respectively. Applying the systems and methods discussed herein, the spatial determination process involves determining a signal strength-to-distance measurement based on the BLE signals emitting from each person's device. For purposes of this example, Device A is the reference device. Therefore, Device A identifies that Device's B and C are emitting BLE signals and determines the signal strength of each device's BLE emission.

Device A then performs the audio-based distance determination based on inaudible acoustic signals communicated to and from Device A to Devices B and C. As discussed above, this involves Device A communicating audio signals via Device A's speaker to Device B and C for reception by each device's microphone. In turn, Device B and C communicate return signals via their speakers for reception by Device A's microphone. Additionally, each device broadcasts the timestamps of each audio transmission. As discussed above, the timestamp transmission can be communicated via a receiver packet as another audio transmission, or communicated via BLE signals between devices.

Additionally, inertial readings of each device are performed and communicated between the devices. The inertial readings provide measurements (i.e., IMU) associated with each device's orientation and movements at/around the location.

After calculating the BLE measurements, audio-distance measurement and IMU, which can performed in any order as the present disclosure is not limited to any specific order of calculation, each measurement is fed to a filter running a Kalman algorithm, referred to as EKF as discussed above. The EKF aggregates and fuses this information together to produce a 3D tracking of the location. As a result, a relative 3D mapping of the location, which reveals the locations of the devices in the room, is communicated to each device.

According to some embodiments, 3D mapping of all the devices at a location within a structure can be provided to each device at the location. The 3D mapping can be a rendering of the location which includes or shows the devices that are present at a location (e.g., a room), and in some embodiments each device's ID (or associated user ID). The rendering can also indicate the position of each device in the location. The positioning can be provided by displaying the surrounding devices in the 3D mapping in accordance with the devices' direction and position, where such positioning can be relative to a particular device or based on the coordinates of the MOM.

Figure 11:
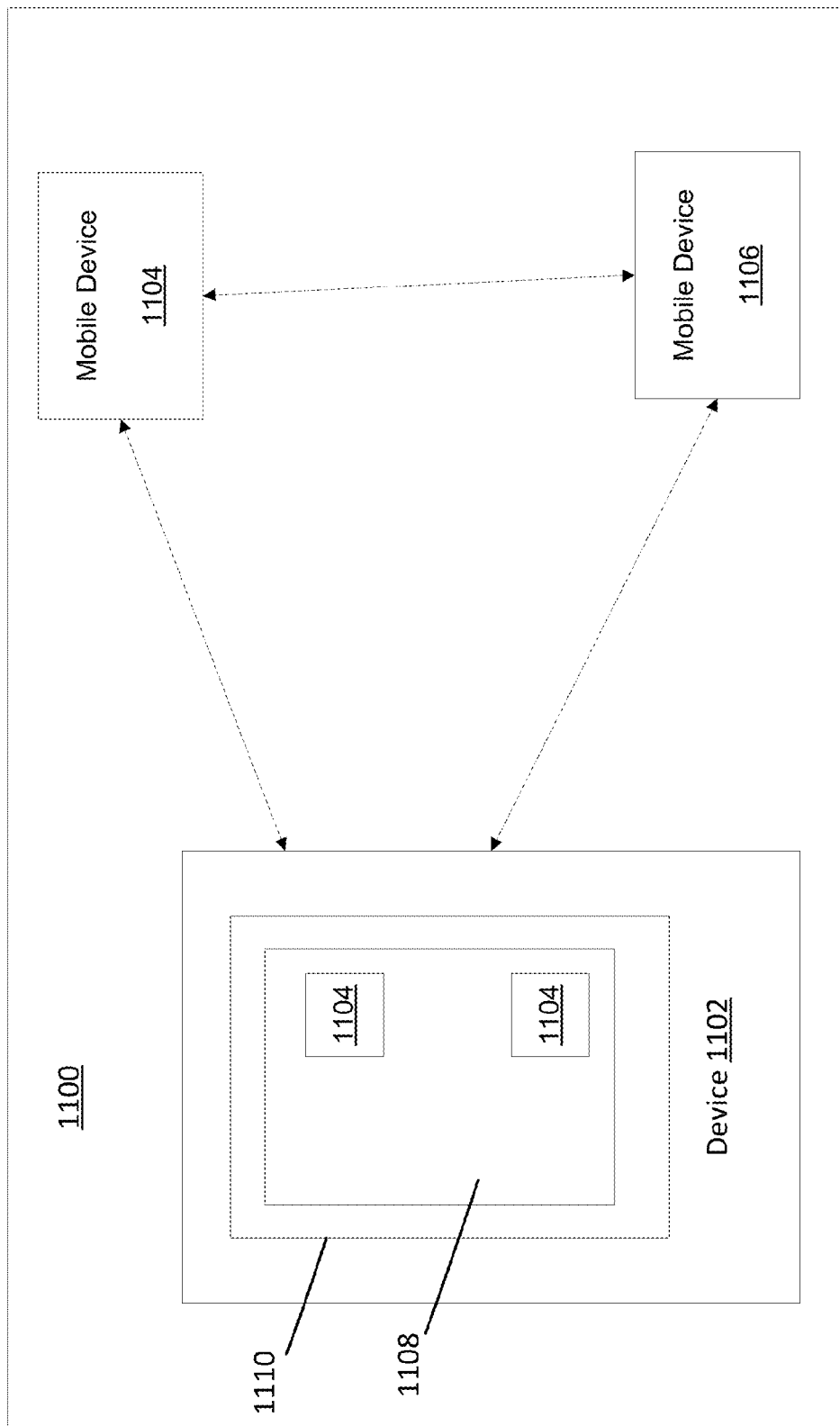
FIG. 11 illustrates an example embodiment in accordance with one or more embodiments of the present disclosure.

For example, as illustrated in FIG. 11, location 1100 can be a store in a mall where 3 devices are located. That is, devices 1102, 1104 and 1106 are concurrently located at the location. This is similarly displayed in FIG. 1 as discussed above. Using device 1102 as the reference device, device 1102 can display a user interface 1110 that displays the 3D mapping 1108 of the room 1100. The dashed lines in the figure illustrated that the devices can communicate with each other over a broadcast network, via BLE packets, via radio signals, over a wireless network, via NFC communication, or any other communication technology, as discussed above. Indeed, as discussed above, information communicated between each device could be broadcast without an ad-hoc network as it could be broadcast using BLE technology, as discussed above in connection with FIG. 1.

Device 1102 illustrates a display of the 3D mapping 1108, which shows the positioning of device 1104 and device 1106 respective to device 1102's position in the room 1100. As illustrated in display 1108, device 1104 is located in the northeast direction of the room (or to the upper right hand corner of the room respective to device 1102's location in the room) and device 1104 is located in the southeast direction of the room (or to the lower right hand corner of the room respective to device 1102's location in the room). As discussed above, based on such rendering of the 3D mapping 1108, device 1102 can communicate with device 1104 and 1106. For example, device 1102 can share files with device 1104 through the user of device 1102 swiping the file (via a touch screen interface of device 1102 as understood by those of skill in the art) in the direction of device 1104. As discussed above, the sharing of the file can be communicated via NFC or BLE packet transmissions, in addition to any other known or to be known communication protocol, as discussed above.

According to some embodiments, the 3D mapping relative to the determining device; therefore, the 3D mapping of the devices in the room, according to this example, are respective Device A's position in the room. This 3D spatial mapping can be used to media exchange, and even for monetization purposes, as discussed below.

Figure 9:
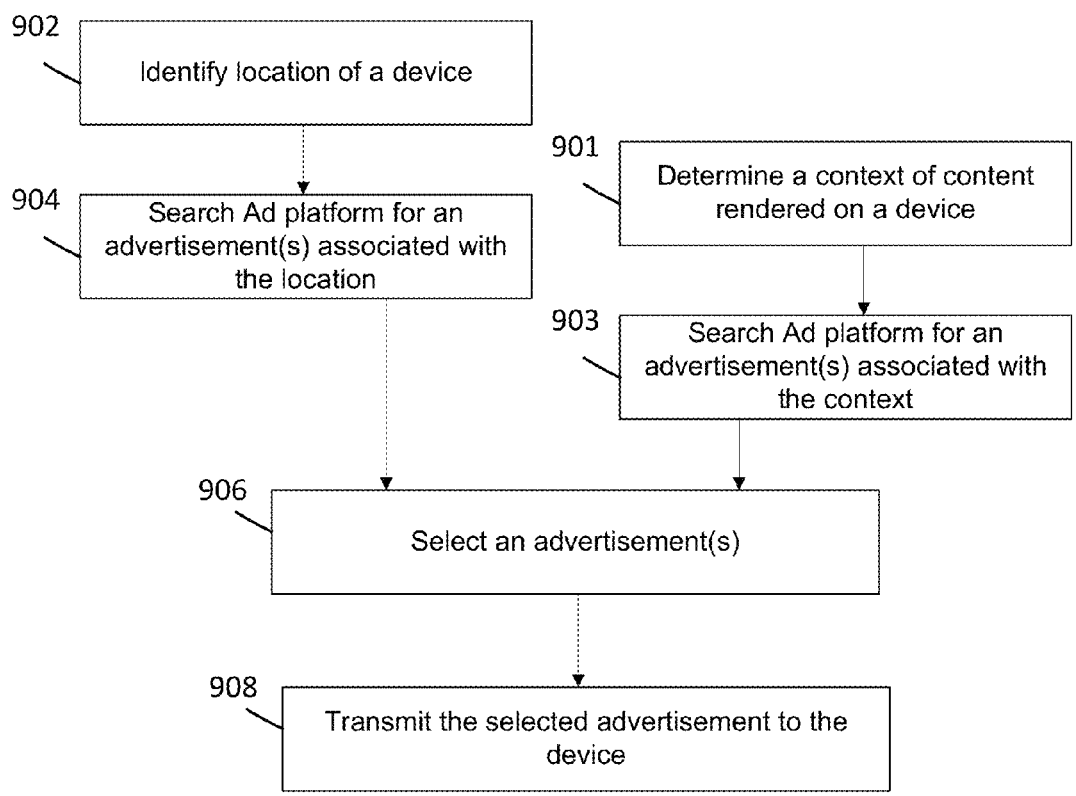
FIG. 9 is a flowchart illustrating steps performed in accordance with some embodiments of the present disclosure.

FIG. 9 is an example of a work flow 900 of serving advertisements to devices based on the 3D spatial mapping discussed above in FIGS. 3-8. Specifically, FIG. 9 illustrates example embodiments of how advertisements are served to users of mobile devices. In Step 902, the determined location information of a user's device at a location is identified. This identification is derived from the 3D spatial mapping of the location from Steps 402-410. In Step 904, the location information is communicated (or shared) to an advertisement platform comprising an ad server and ad database. Upon receipt of the location information, the advertisement server performs a search of the ad database for a relevant advertisement. The search for an advertisement is based at least on the location information. Specifically, Step 904 involves the advertisement server searching the advertisement database for an advertisement(s) that is associated with or matches the identified location within the location. For example, if a user is in a mall, and is determined to be located near a restaurant within the mall, the selected ad can correspond to a coupon associated with that particular restaurant. This determined location is based, at least in part, on the 3D spatial mapping of the location, as discussed above.

FIG. 9 also illustrates an embodiment where content that is being shared between users at the location can be used to determine advertisement information. For example, after determining the 3D spatial mapping of a location, a user may perform a media exchange with another user at that location, where that media can be used as the context for searching an ad platform. In another example, if two users are determined to be within a predetermined distance to each other based the 3D mapping (e.g., they are next to each other most likely viewing content on one of the user's device), a context can be determined based on the content being viewed/rendered. Thus, Step 901 includes determining a context from content being rendered by at least one device at the location. As discussed above, such rendering can include, but is not limited to, playing or viewing content, transferring content, storing content, uploading content, downloading content, and the like. Step 903 is similar to Step 904, in that an ad platform is searched, however, in Step 903 the ad database is searched for an ad(s) associated with the determined context from Step 901.

In Step 906, an advertisement is selected (or retrieved) based on the results of Step 903 and/or 904. In some embodiments, the advertisement can be selected based upon the result of Steps 903 and/or 904, and modified to conform to attributes of the device upon which the advertisement will be displayed. In Step 908, the selected advertisement is shared or communicated to at least one user's device at the location. In some embodiments, the selected advertisement is sent directly to each user's mobile device through applicable communication protocol and/or communication application.

Figure 10:
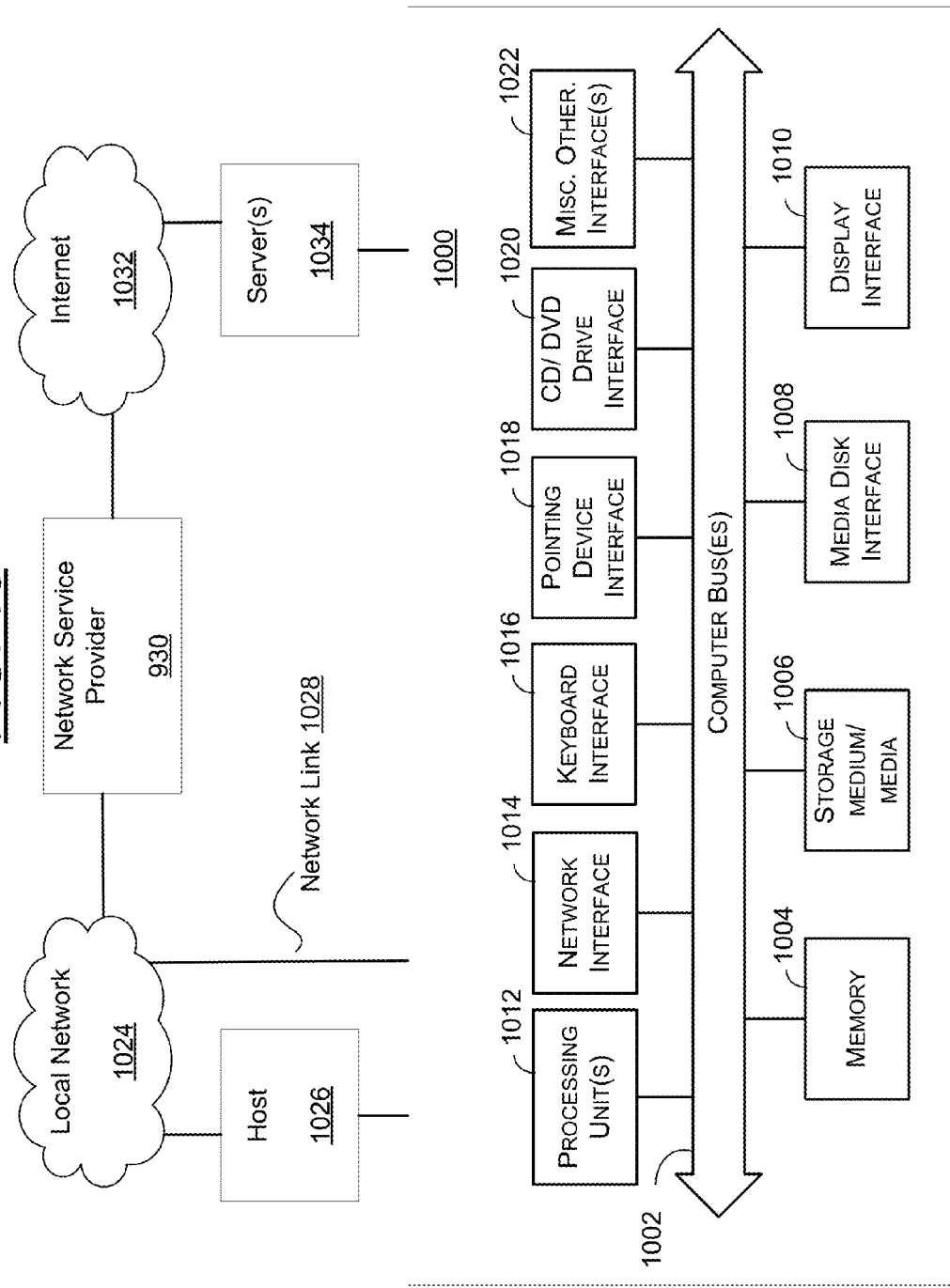
FIG. 10 is a block diagram illustrating architecture of a hardware device in accordance with one or more embodiments of the present disclosure.

As shown in FIG. 10, internal architecture 1000 includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), media disk drive interface 1020 as an interface for a drive that can read and/or write to media including removable media such as floppy, CD-ROM, DVD, media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces and a universal serial bus (USB) interface.

Memory 1004 interfaces with computer bus 1002 so as to provide information stored in memory 1004 to CPU 1012 during execution of software programs such as an operating system, application programs, device drivers, and software modules that comprise program code, and/or computer executable process steps, incorporating functionality described herein, e.g., one or more of process flows described herein. CPU 1012 first loads computer executable process steps from storage, e.g., memory 1004, computer readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1028 typically provides information communication using transmission media through one or more networks to other devices that use or process the information. For example, network link 1028 may provide a connection through local network 1024 to a host computer 1026 or to equipment operated by a Network or Internet Service Provider (ISP) 1030. ISP equipment in turn provides data communication services through the public, worldwide packet-switching communication network of networks now commonly referred to as the Internet 1032.

A computer called a server host 1034 connected to the Internet 1032 hosts a process that provides a service in response to information received over the Internet 1032. For example, server host 1034 hosts a process that provides information representing video data for presentation at display 1010. It is contemplated that the components of system 1000 can be deployed in various configurations within other computer systems, e.g., host and server.

At least some embodiments of the present disclosure are related to the use of computer system 1000 for implementing some or all of the techniques described herein. According to one embodiment, those techniques are performed by computer system 1000 in response to processing unit 1012 executing one or more sequences of one or more processor instructions contained in memory 1004. Such instructions, also called computer instructions, software and program code, may be read into memory 1004 from another computer-readable medium 1006 such as storage device or network link. Execution of the sequences of instructions contained in memory 1004 causes processing unit 1012 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1000. Computer system 1000 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1002 as it is received, or may be stored in memory 1004 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device, Bluetooth Low Energy (BLE) signals from devices at a location;
   identifying, via the computing device, said devices as being concurrently present at the location based on the received BLE signals;
   determining, via the computing device, a BLE signal strength associated with each identified device based on the received BLE signals;
   determining, via the computing device, an audio-distance measurement associated with each identified device, said audio-distance measurement based on acoustic signals and time stamps communicated to and from each identified device;
   receiving, at the computing device, an inertia measurement from each device; and
   determining, via the computing device, a three-dimensional (3D) spatial mapping of said location based on, for each identified device, the BLE signal strength, the audio-distance measurement and the inertia measurement, said 3D spatial mapping comprising identifiers and positional information of each identified device within said location.

2. The method of claim 1, wherein said determination of the 3D spatial mapping comprises fusing said BLE signal strength, audio-distance measurement and the inertia measurement of each device.

3. The method of claim 1, further comprising:
   broadcasting, via the computing device, said determined 3D spatial mapping of the location to each identified device at said location.

4. The method of claim 1, wherein said inertia measurement for each device is based on a constant rotational reference associated with said location, said rotational reference is associated with a magnetometer associated with said location.

5. The method of claim 1, wherein said inertia measurement for each device comprises at least one of orientation and motion information.

6. The method of claim 1, wherein said determining said audio-distance measurement based on said acoustic signals comprises:
- receiving, by at least one microphone of the computing device, a first acoustic signal from a microphone of each identified device; and
- communicating, from at least one speaker of the computing device, a second acoustic signal for reception by a microphone of each identified device.

7. The method of claim 6, further comprising:
- receiving, at the computing device, a time stamp associated with the second acoustic signal from each identified device, said second acoustic signal timestamp associated with a time the second acoustic signal was received by each identified device; and
- communicating, via the computing device, a time stamp associated with the first acoustic signal to each identified device, said first acoustic signal time stamp associated with a time the first acoustic signal was received by the computing device.

8. The method of claim 1, wherein said BLE signal strength determination is based on said determined audio-distance measurement, wherein said BLE signal strength for an identified device is refined in accordance with an audio-distance measurement associated with said identified device.

9. The method of claim 1, wherein each identified device is within a predetermined distance to the computing device within said location.

10. The method of claim 1, further comprising:
- receiving, at the computing device, a selection of a device identified in said 3D spatial mapping, said selection enabling communication with the selected device.

11. The method of claim 10, wherein said communication occurs over at least one of a network associated with said location and via a BLE signal packet communicated with the selected device.

12. The method of claim 10, further comprising:
- determining, via the computing device, the 3D spatial mapping of said location based on, for each identified device, the audio-distance measurement.

13. The method of claim 1, wherein said 3D spatial mapping is updated upon a change in said positional information of at least one device determined to be at said location.

14. A non-transitory computer-readable storage medium tangibly encoded with computer-executable instructions, that when executed by a processor associated with a computing device, performs a method comprising:
- receiving Bluetooth Low Energy (BLE) signals from devices at a location;
- identifying said devices as being concurrently present at the location based on the received BLE signals;
- determining a BLE signal strength associated with each identified device based on the received BLE signals;
- determining an audio-distance measurement associated with each identified device, said audio-distance measurement based on acoustic signals and time stamps communicated to and from each identified device;
- receiving an inertia measurement from each device;
- determining a three-dimensional (3D) spatial mapping of said location based on, for each identified device, the BLE signal strength, the audio-distance measurement and the inertia measurement, said 3D spatial mapping comprising identifiers and positional information of each identified device within said location.

15. The non-transitory computer-readable storage medium of claim 14, wherein said determination of the 3D spatial mapping comprises fusing said BLE signal strength, audio-distance measurement and the inertia measurement of each device.

16. The non-transitory computer-readable storage medium of claim 14, further comprising:
- broadcasting said determined 3D spatial mapping of the location to each identified device at said location; and
- receiving a selection of a device identified in said 3D spatial mapping, said selection enabling communication with the selected device.

17. The non-transitory computer-readable storage medium of claim 14, further comprising:
- wherein said determining said audio-distance measurement based on said acoustic signals comprises:
  - receiving a first acoustic signal from at least one microphone of each identified device; and
  - communicating a second acoustic signal for reception by at least one microphone of each identified device;
- receiving a time stamp associated with the second acoustic signal from each identified device, said second acoustic signal timestamp associated with a time the second acoustic signal was received by each identified device; and
- communicating a time stamp associated with the first acoustic signal to each identified device, said first acoustic signal time stamp associated with a time the first acoustic signal was received by the computing device.

18. The non-transitory computer-readable storage medium of claim 14, wherein said BLE signal strength determination is based on said determined audio-distance measurement, wherein said BLE signal strength for an identified device is refined in accordance with an audio-distance measurement associated with said identified device.

19. A computing device comprising:
- a processor;
- a non-transitory computer-readable storage medium for tangibly storing thereon program logic for execution by the processor, the program logic comprising:
  - receiving logic executed by the processor for receiving Bluetooth Low Energy (BLE) signals from devices at a location;
  - identification logic executed by the processor for identifying said devices as being concurrently present at the location based on the received BLE signals;
  - determination logic executed by the processor for determining a BLE signal strength associated with each identified device based on the received BLE signals;
  - determination logic executed by the processor for determining an audio-distance measurement associated with each identified device, said audio-distance measurement based on acoustic signals and time stamps communicated to and from each identified device;
  - receiving logic executed by the processor for receiving an inertia measurement from each device;
  - determination logic executed by the processor for determining a three-dimensional (3D) spatial mapping of said location based on, for each identified device, the BLE signal strength, the audio-distance measurement and the inertia measurement, said 3D spatial mapping comprising identifiers and positional information of each identified device within said location; and communication logic executed by the processor for broadcasting said determined 3D spatial mapping of the location to each identified device at said location.

\* \* \* \* \*